United States Patent
Landre et al.

(10) Patent No.: US 9,206,912 B2
(45) Date of Patent: Dec. 8, 2015

(54) DUAL DOOR FAN AIR MODULATING VALVE

(71) Applicant: The Boeing Company, Chicago, IL (US)

(72) Inventors: Eric G. Landre, Bellevue, WA (US); David W. Foutch, Seattle, WA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 13/748,325

(22) Filed: Jan. 23, 2013

(65) Prior Publication Data

US 2014/0202539 A1 Jul. 24, 2014

(51) Int. Cl.
*E03B 1/00* (2006.01)
*F16K 3/30* (2006.01)
*B64D 13/00* (2006.01)

(52) U.S. Cl.
CPC . *F16K 3/30* (2013.01); *B64D 13/00* (2013.01); *Y10T 137/0318* (2015.04); *Y10T 137/87338* (2015.04); *Y10T 137/87362* (2015.04)

(58) Field of Classification Search
CPC ............. F16K 3/30; F16K 3/32; B64D 13/00; B64D 2013/0603; Y10T 137/0318; Y10T 137/87362; Y10T 137/87338
USPC ............ 137/1, 599.11, 599.14; 251/231, 235, 251/279, 298, 305; 60/266, 267, 226.1, 60/226.3; 415/1, 145, 175–178
See application file for complete search history.

(56) References Cited

U.S. PATENT DOCUMENTS

| | | | | |
|---|---|---|---|---|
| 1,568,410 | A * | 1/1926 | Minter | 123/590 |
| 5,113,649 | A * | 5/1992 | Siedlecki, Jr. | 60/226.3 |
| 5,184,461 | A * | 2/1993 | Stransky et al. | 60/226.3 |
| 5,319,927 | A * | 6/1994 | Maguire | 60/226.1 |
| 5,706,649 | A * | 1/1998 | Robinson et al. | 60/226.2 |
| 7,810,312 | B2 * | 10/2010 | Stretton et al. | 60/266 |
| 7,861,513 | B2 * | 1/2011 | Stretton | 60/226.1 |
| 2007/0101731 | A1 | 5/2007 | Bayt et al. | |
| 2008/0083218 | A1 * | 4/2008 | Abram et al. | 60/324 |
| 2008/0230651 | A1 * | 9/2008 | Porte | 244/118.5 |
| 2012/0180509 | A1 | 7/2012 | DeFrancesco | |
| 2012/0216545 | A1 | 8/2012 | Sennoun et al. | |
| 2012/0272658 | A1 * | 11/2012 | Murphy | 60/783 |

* cited by examiner

*Primary Examiner* — Jessica Cahill
(74) *Attorney, Agent, or Firm* — Felix L. Fischer

(57) ABSTRACT

A fan air modulating valve (FAMV) employs a pair of doors rotatably attached at the fan bypass air exit of a precooler. An actuator engages the doors for simultaneous rotation through a range of motion from a first closed position to a second open position, wherein trailing edges of said doors sealingly engage an exit plenum extending from the precooler in the first closed position and fan bypass air flow is modulated by positioning the doors within the range of motion between the first and second positions.

20 Claims, 14 Drawing Sheets

DUAL DOOR FAN AIR MODULATING VALVE

BACKGROUND INFORMATION

1. Field

Embodiments of the disclosure relate generally to the field of fan air modulation for aircraft environmental control precooler systems and more particularly to an air modulating valve for a precooler with dual doors for flow redirection activated for mirrored rotation by a single actuator.

2. Background

Large commercial aircraft employ environmental control system (ECS) for cabin air pressure and temperature that rely on bleed air from the engine compressor section. In aircraft with turbofan engines the compressor bleed air is cooled by a heat exchanger—termed a precooler—with diverted fan bypass air flow and is then routed to the ECS system and any other systems that use the bleed air. In the case of tight (constrained) engine installations, the exhaust from the precooler can be very close to other hardware such as engine accessories, aft mount for the engine or structure of the strut. The proximity of the precooler exhaust, which may operate at some fairly high Mach number flows, to the aft mount for the engine can also generate undesirably high pressure losses. These pressure losses may be detrimental to the precooler performance and to the design optimization of the ECS system, especially for modern, higher-bypass-ratio turbofans, where the supply pressure of the fan bypass is lower than earlier turbofans. Prior art systems employ a combination of a fan air modulation valve upstream of the precooler for flow regulation and fixed position louvers mounted on the aft face of the precooler to divert the flow.

It is therefore desirable to provide to provide a higher efficiency system for control of the fan bypass air flow by reducing the pressure losses from the heat exchanger exhaust flow and also to control the direction and pattern of the exhaust flow.

SUMMARY

Embodiments disclosed herein provide a fan air modulating valve (FAMV) employing a pair of doors rotatably attached at the fan bypass air exit of a precooler. An actuator engages the doors for simultaneous rotation from a first closed position, wherein trailing edges of said doors sealingly engage an exit plenum extending from the precooler, to a second open position, wherein the doors and the surface of the exit plenum form a flow path to direct the exhaust flow in the desired direction.

The flow path of the fan bypass air in a precooler system incorporates an inlet plenum receiving incoming fan bypass air with a precooler operatively attached to the inlet plenum to receive the fan bypass air for cooling of compressor bleed. An exit plenum is operatively attached to the precooler to receive exiting fan bypass air. A fan air modulating valve (FAMV) has a pair of doors rotatably attached at the exit plenum An actuator engages the doors for simultaneous mirrored rotation from a first closed position to a second open position, wherein trailing edges of said doors sealingly engage the exit plenum in the closed position.

A method for modulating the amount of fan bypass air flow and controlling the direction and pattern of the exhausted fan bypass air in a precooler system is accomplished by the embodiments herein by hinging dual doors located at an exit of a precooler for mirrored rotation. The doors are engaged with tie rods extending from a single actuator and urged to a closed position with trailing edges sealingly engaging an exit plenum. The doors are actuated by the single actuator through a range of motion to a fully open position to rotate the doors from the closed position to an open position. Flow volume is adjusted by the position of the doors within the range of motion and direction and flow pattern of the exhausting fan bypass flow air is controlled by the doors.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a fan air modulating valve (FAMV) that, in a single integrated system, combines a flow volume control valve function and a diverter function for control of flow direction and flow pattern from a fan bypass air flow exit in a precooler with minimized pressure loss The embodiments allow the exhaust flow to be turned with fewer moving parts, lower cost and better reliability than prior art systems employing short actuated or fixed louvers.

Figure 1:
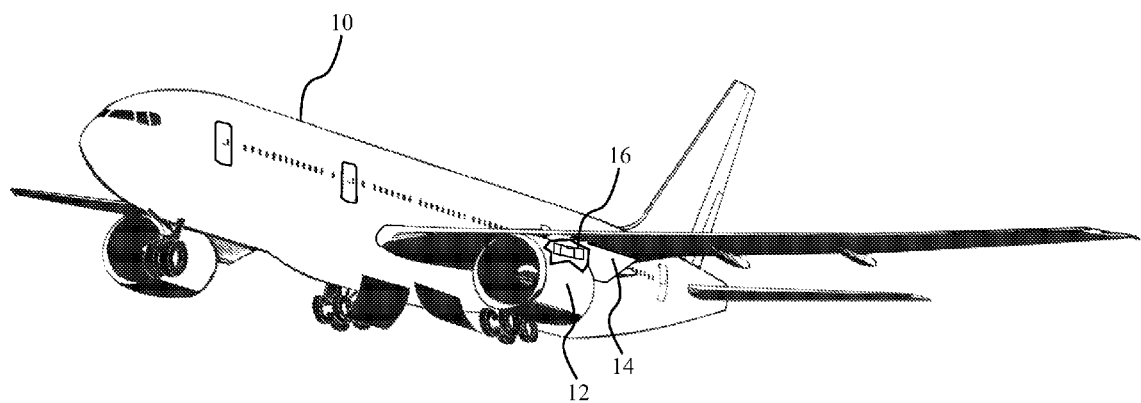
FIG. 1 is pictorial view of a commercial aircraft showing the placement of embodiments for a fan air modulating valve (FAMV) disclosed herein.
Figure 2:
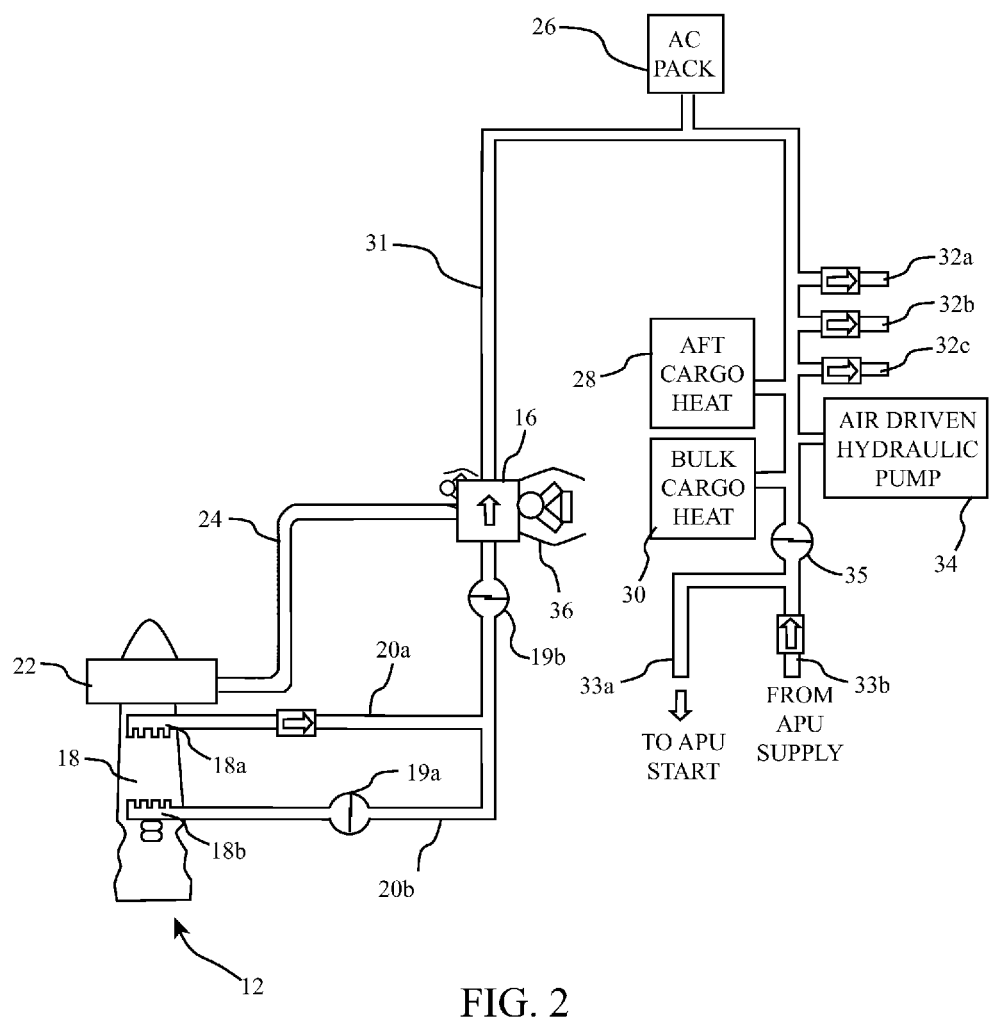
FIG. 2 is a schematic diagram of an aircraft environmental control system (ECS) employing the embodiments disclosed herein.
Figure 3:
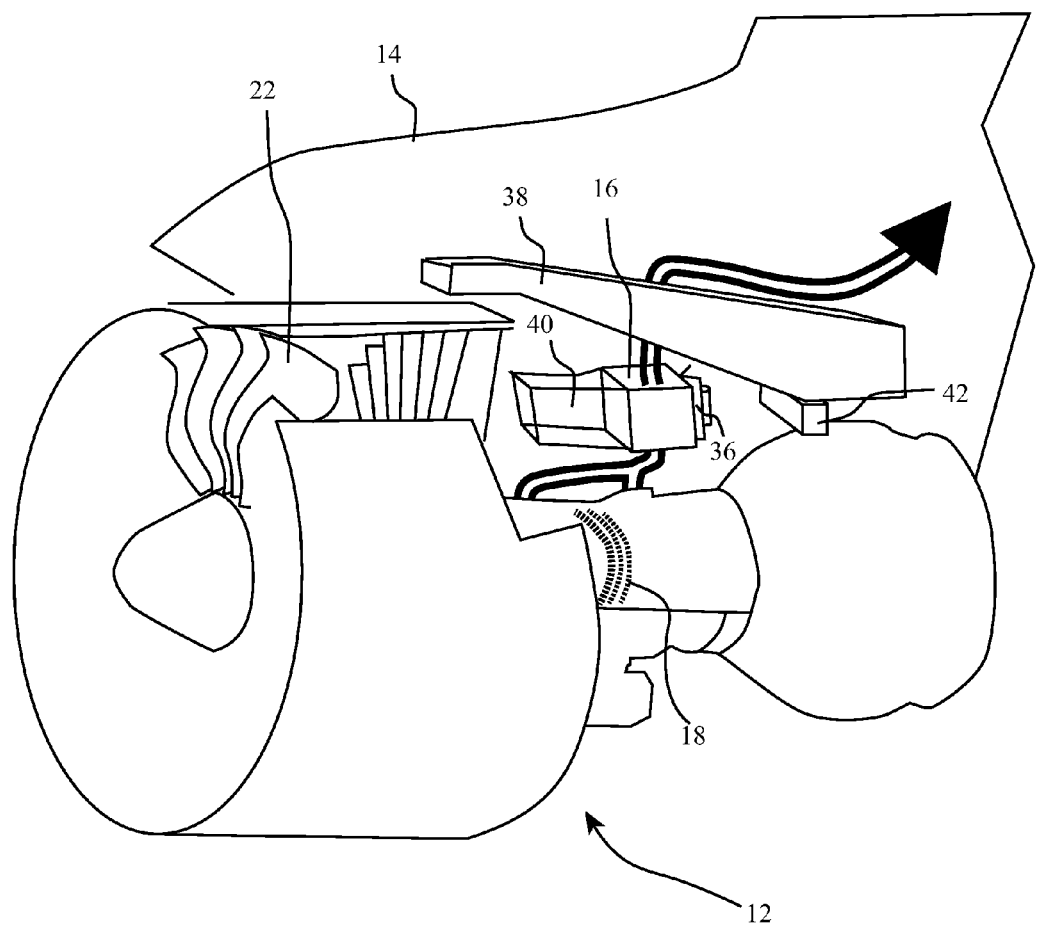
FIG. 3 is a pictorial side view of details of the installation of the embodiments disclosed herein with reference to a turbofan engine and support structure.
Figure 4:
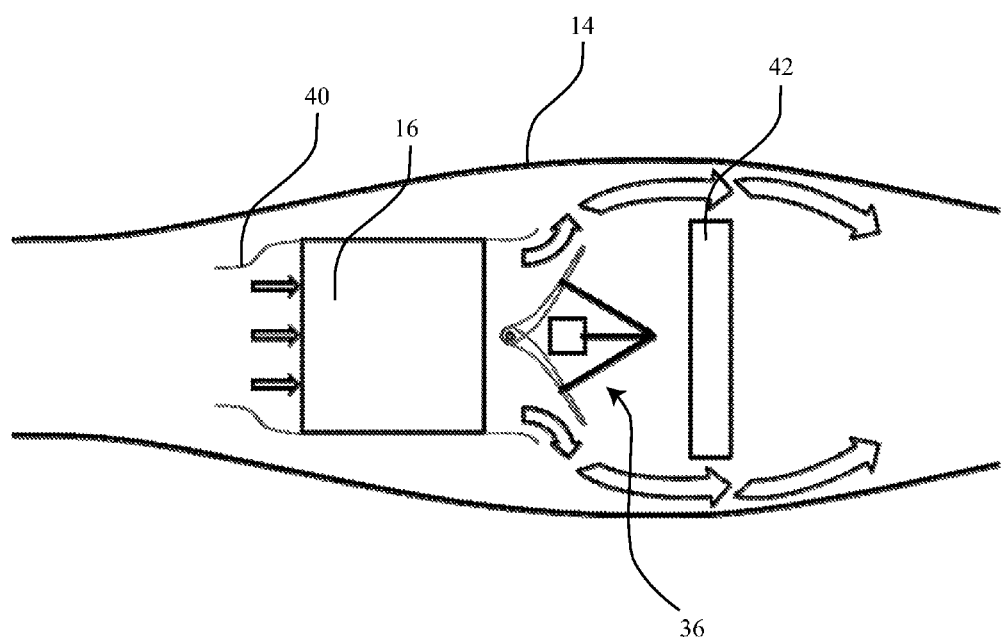
FIG. 4 is a top view of the installation details of FIG. 3.

Referring to the drawings, FIG. 1 shows a commercial aircraft 10 having engines 12 mounted to the wing via a structural strut 38 (shown in detail in FIG. 3) which is enclosed in a strut fairing 14. A precooler 16 mounted below the strut 38 and within the strut fairing 14, receives bleed air flow from a compressor section 18 of the engine through conduits 20a and 20b as shown in FIGS. 2 and 3 and 4. Cooling flow for the precooler 16 is extracted from bypass flow in the engine fan section 22 and provided to the precooler through conduit 24 of the schematic of FIG. 2, shown also as the inlet 40 of FIG. 3. While described in the embodiments as a precooler for air conditioning systems, the FAMV may be employed in similar fan bypass air coolers for oil cooling or other applications for fan bypass air cooled devices.

As shown in detail in FIG. 2, the precooler 16 receives flow from a low pressure section 18a of the compressor 18 as well as a high pressure section 18b regulated by a high pressure valve 19a and supplies pressurized air from the compressor bleed through valve 19b the precooler 16 to the air conditioning (AC) packs 26. In an example aircraft compressor bleed is also provided to aft cargo heat 28 and bulk cargo heat 30 in the aircraft through manifold 31. Additional outlets represented in general by ports 32a-32c may be provided to route the bleed air for such system as wing anti-ice, engine starters, hydraulic reservoir pressurization and potable water pressurization. An air driven hydraulic pump 34 connected to manifold 31 may also be powered by the supplied bleed air. Manifold 31 may also connect to the auxiliary power unit (APU) for the aircraft to supply APU start air through conduit 33a and receive air from the APU air supply through conduit 33b to supply air to the other aircraft systems controlled by valve 35. These are exemplary of the systems employing bleed air from a typical precooler installation and are not intended to limit or otherwise define the operation of the presently disclosed embodiments. Precooler 16 cools the bleed air using the fan section bypass flow provided through conduit 24, and the amount of bypass flow supplied to the precooler is controlled by a FAMV 36, which will be described in greater detail subsequently, at the outlet of the precooler. Initial temperature of the compressor bleed air entering the precooler may be in the range of 300 to 1000 degrees F. Resulting output temperatures of the fan bypass air used for cooling of the bleed air in the precooler may reach temperatures in the range of 300 to 600 degrees F. Directional control of the exiting fan bypass air may therefore be critical to remain within structural and operational constraints.

For a multiengine aircraft, a similar system as that described with respect to FIG. 2 may be present for each or one of the additional engines connecting into manifold 31 through appropriate valving.

As shown in FIG. 3 in schematic form without actual depiction of structural attachments, engine 12 is mounted to the aircraft by an engine strut 38 within the strut fairing 14. Precooler 16 is connected through an inlet plenum 40 to receive bypass air from the fan section 22 of the engine 12. For the example shown, if flow of fan bypass air through the precooler were allowed to continue directly aft it would impinge upon a rear engine mount 42 connecting the aft end of the engine 12 to the strut 38. The FAMV 36 interfaced to the exit of the precooler 14 acts as a valve to control the flow of fan bypass air through the precooler and additionally acts as a diverter to direct outlet flow around the rear engine mount 42 as best seen in FIG. 4.

Figure 5:
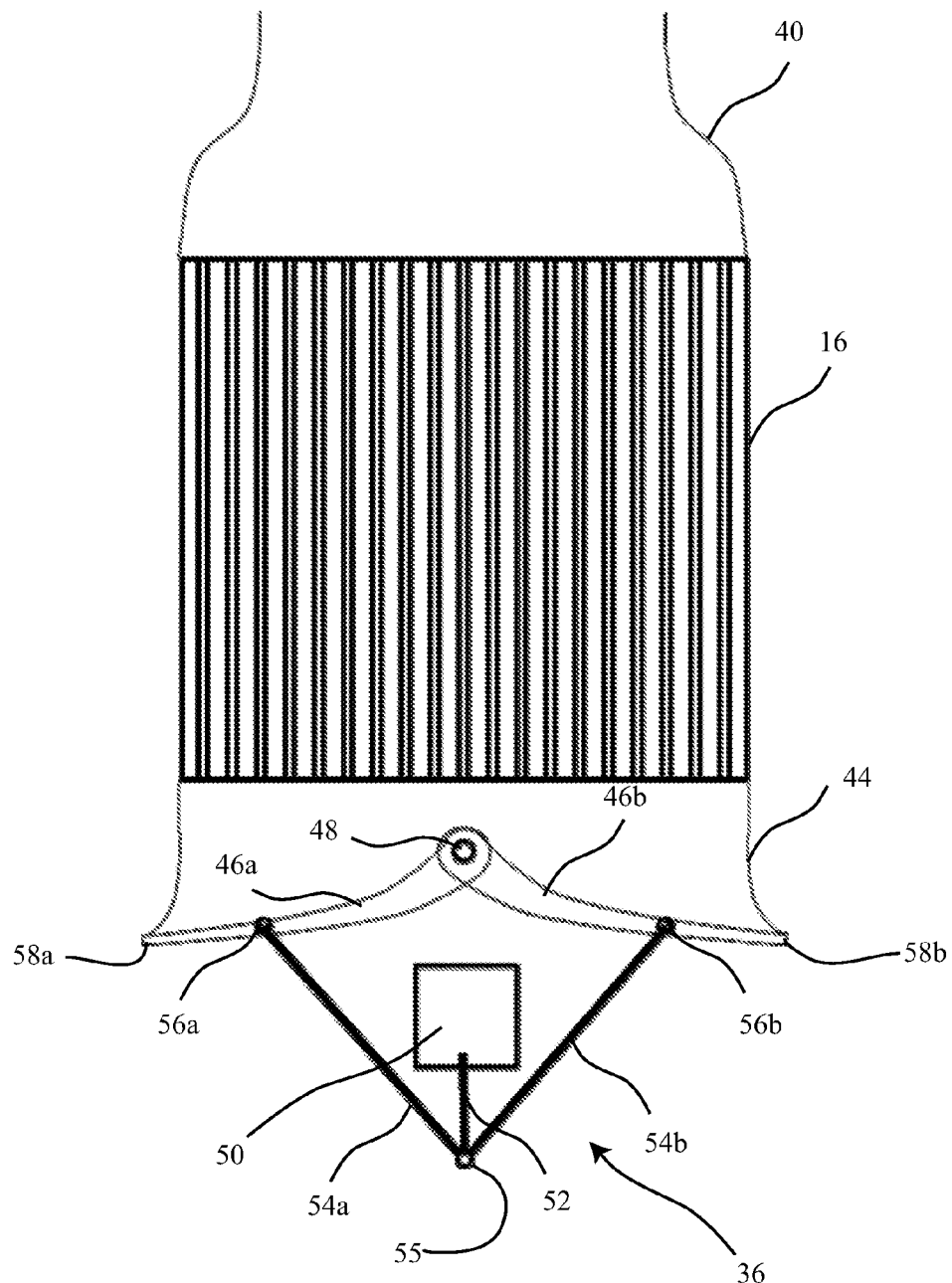
FIG. 5 is a top section view of a heat exchanger system employing a first embodiment of the FAMV in the closed position.

FIG. 5 shows a top view of a first embodiment of the FAMV 36 in relation to the precooler 16. Inlet plenum 40 provides the interface for the precooler to receive fan bypass air. An exit plenum 44 extends aft from the precooler 16. The exit plenum may be formed from an extension of the walls of the precooler aft of the heat exchanger sufficient to house the FAMV and need not comprise a separate component. FAMV 36 incorporates flow control and directing doors 46a and 46b which are rotatable about a central hinge 48. An actuator 50 having a push rod 52 is connected through tie rods 54a and 54b to the doors 46a and 46b respectively from a single pivot 55 for simultaneous motion. For the embodiment shown, the doors have an aerodynamic or airfoil shape and the tie rods 54a and 54b connect at approximately mid chord of the airfoils in hinged joints 56a and 56b. In a closed position as shown in FIG. 5, the trailing edges 58a and 58b of doors 46a and 46b respectively are received against a trailing edge of the outlet plenum 44 to shut off flow of fan bypass air through the precooler 16. Details of the flow conduits for the bleed air are not shown.

Figure 6:
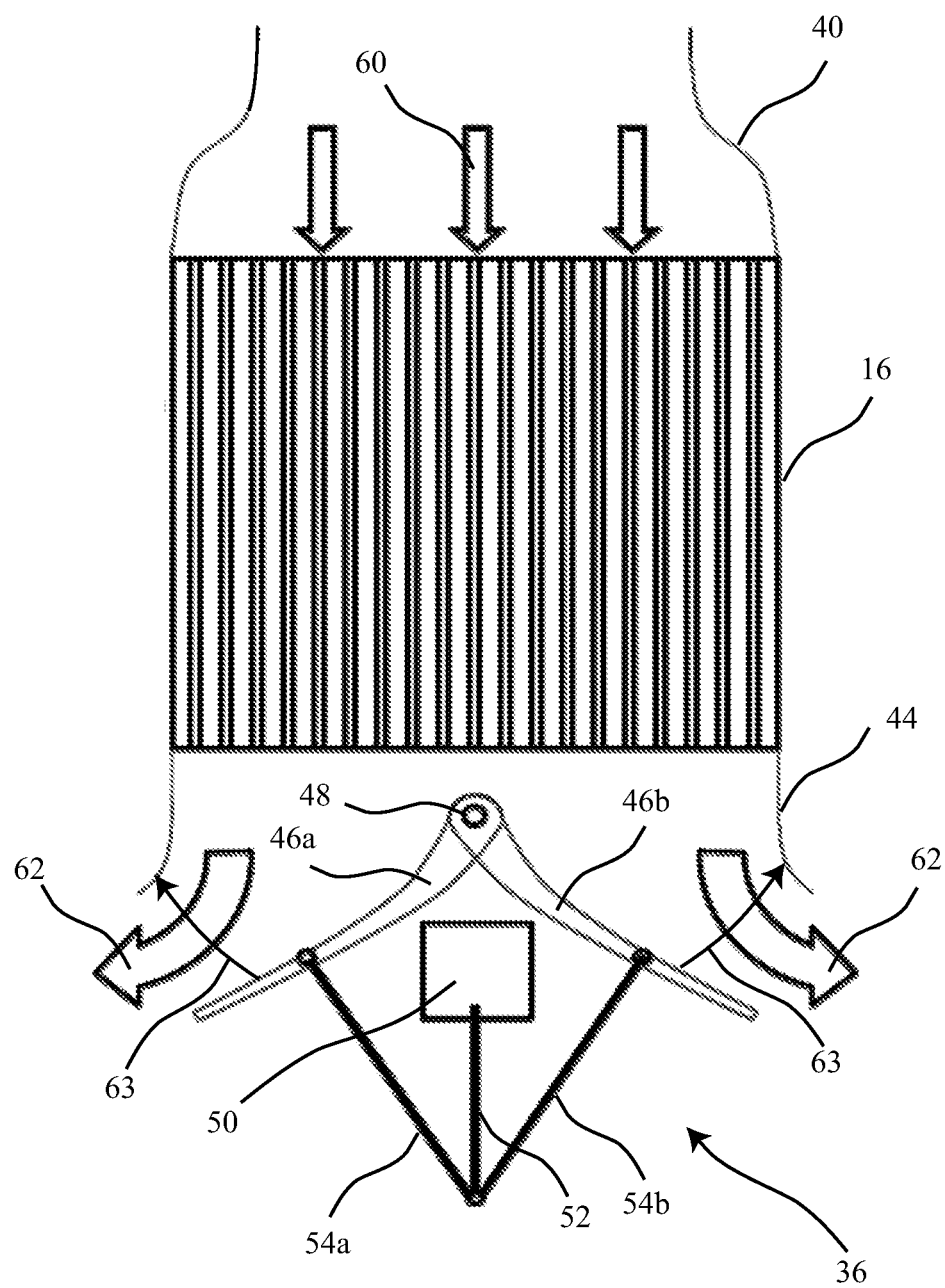
FIG. 6 is a top section view of the heat exchanger system of FIG. 5 with the FAMV in the open position.

FIG. 6 shows the FAMV 36 in the fully open position. The flow of the fan bypass air into the precooler is indicated by arrow 60. Actuator rod 52 has been extended to simultaneously draw tie rods 54a and 54b outward from the closed position causing doors 46a and 46b to rotate in opposite or mirrored rotation about hinge 48. Outlet flow from the precooler represented by arrows 62 is turned by the doors 46a and 46b from the axial flow direction through the precooler laterally, both inboard and outboard, for deflection around the rear engine mount 42 or other heat sensitive systems (as best seen in FIG. 4). Flow volume of fan bypass air is controllable by the FAMV by positioning the doors at any desired rotation along arcs 63 between the fully closed position of FIG. 5 and the fully open position of FIG. 6 using the actuator 50. Bleed air from the compressor section is routed through the precooler substantially perpendicular to the flow direction of the fan bypass air represented by arrow 60 (e.g. into and out of the drawing page). Details of the flow conduits for the bleed air are not shown.

Figure 7:
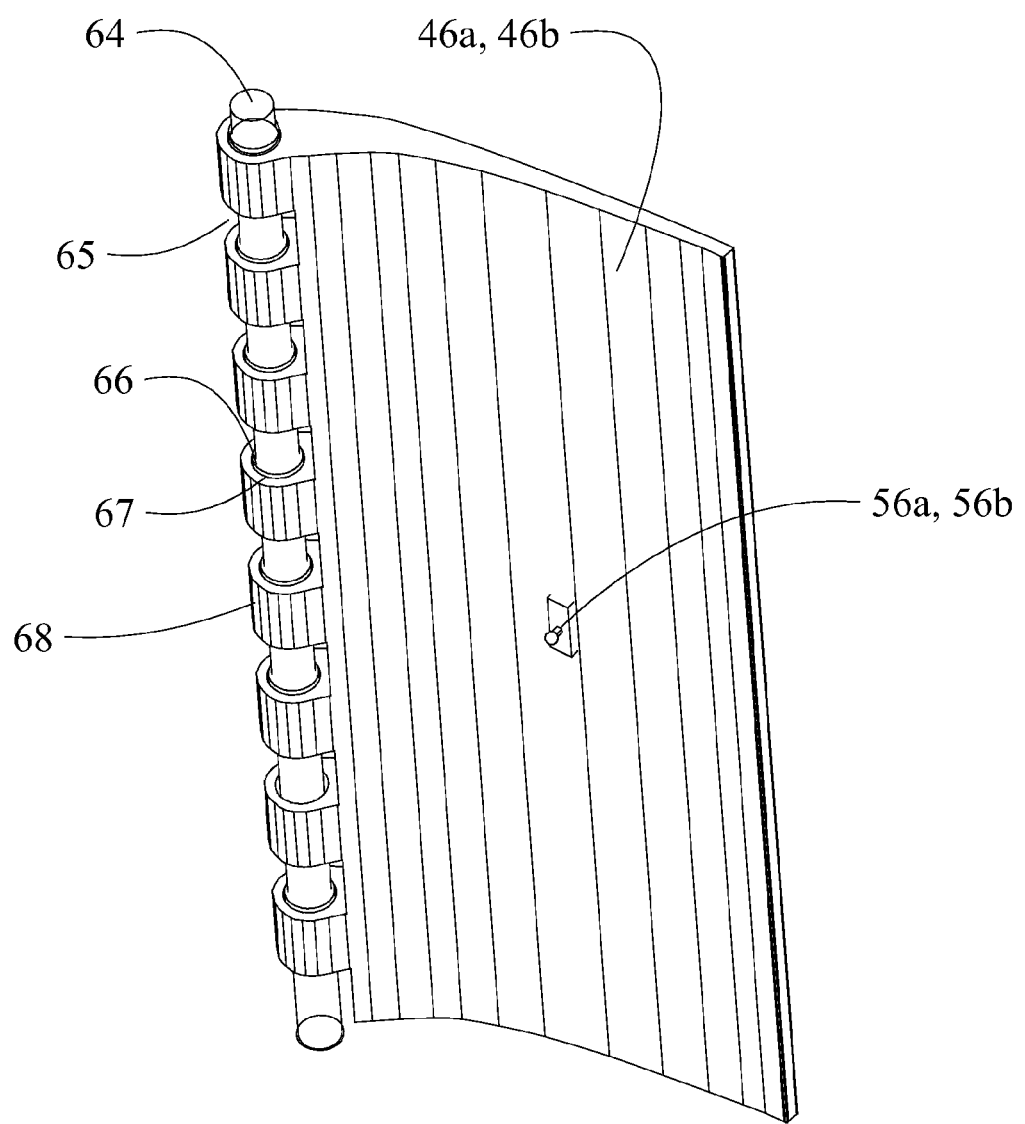
FIG. 7 is an isometric hidden line view of an exemplary airfoil structure for use as the doors with the embodiment of FIGS. 6 and 7.

An example airfoil structure for use with the FAMV embodiment of FIGS. 5 and 6 is shown in FIG. 7. The airfoil of doors 46a, 46b employ a hinge rod 64 which is mounted to the upper and lower structure of the exit plenum. While the embodiment shown in the drawings provides the hinge rod extending completely through the structure in alternative embodiments a monocoque structure for load bearing with rod ends may be employed. The leading edge of each door is alternatingly indented with reliefs 65 to receive the mating leading edge elements of the second door. Bearings 66 supported within axial bores 67 in the leading edge are received over the hinge rod 64 for rotation of the door. The axial bores at the leading edge 68 of the airfoil structurally may constitute a portion of the airfoil leading edge or support for a leading edge skin to minimize the indented reliefs. Hinge joints 56a, 56b are provided for attachment to the tie rods 54a and 54b as previously described.

Figure 8:
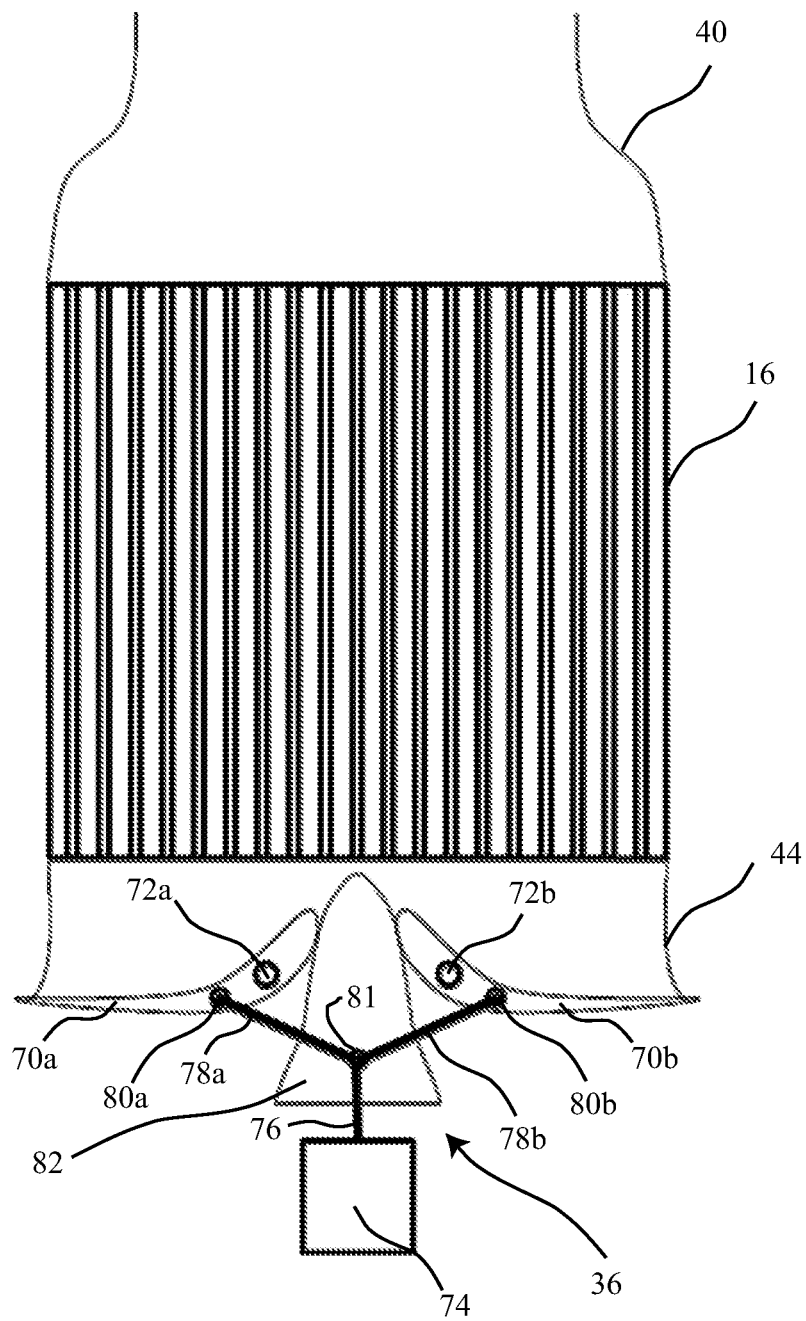
FIG. 8 is s a top section view of a heat exchanger system employing a second embodiment of the FAMV in the closed position.

A second embodiment of the FAMV 36 is shown in the fully closed position in FIG. 8. Precooler 16 with inlet plenum 40 and outlet plenum 44 may be substantially identical to the initial embodiment described with respect to FIGS. 5 and 6. Doors 70a and 70b are rotatable about hinges 72a and 72b, respectively. Doors 70a and 70b again employ a selected airfoil shape and hinges 72a and 72b are placed at approximately the ¼ chord point for the embodiment shown. An actuator 74 having a push rod 76 is attached to the doors 70a and 70b with tie rods 78a and 78b at hinged joints 80a and 80b. The tie rods 78a and 78b connect to the push rod 76 at the hinged joint 81. An aerodynamic centerbody 82 is located between the leading edges of the doors 70a and 70b. As with the first embodiment, when the actuator is in a first closed position with the rod 76 extended, the doors 70a and 70b are rotated with trailing edges sealing on the edges of the outlet plenum 44. Additionally, the leading edges of doors 70a and 70b sealingly engage the aerodynamic centerbody thereby shutting off flow of fan bypass air through the precooler 16.

Figure 9:
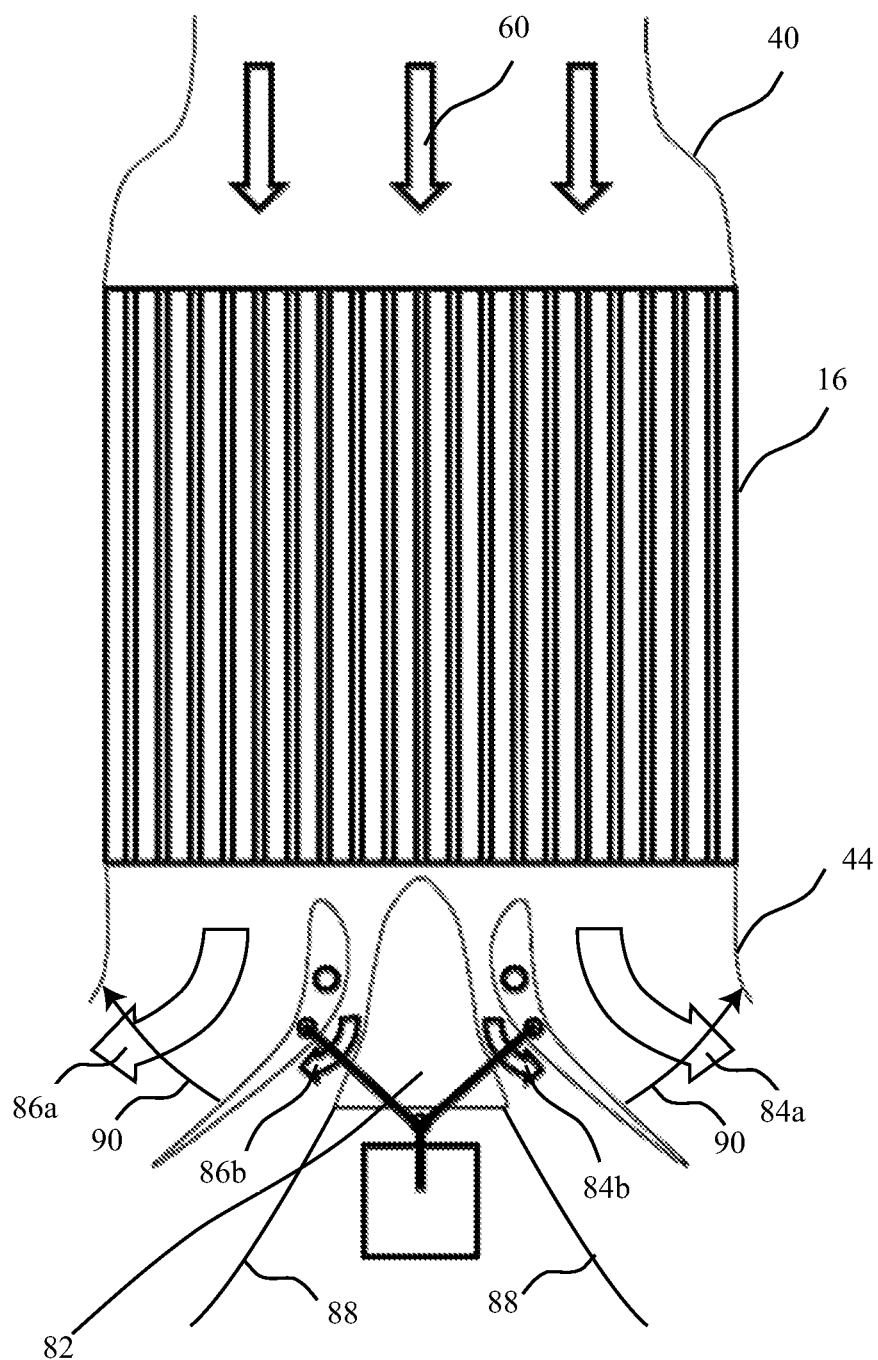
FIG. 9 is a top section view of the heat exchanger system of FIG. 8 with the FAMV in the open position.

A fully open position of the second embodiment of the FAMV 36 is shown in FIG. 9. With the actuator 74 in a second open position with rod 76 retracted, doors 70a and 70b are rotated about their respective hinges 72a and 72b by tie rods 78a and 78b creating four flow paths for fan bypass air between the doors and plenum exit and between the doors and the central aerodynamic centerbody; two outboard flow paths indicated by arrows 84a and 84b and a two inboard flow paths indicated by arrows 86a and 86b. Aerodynamic shaping of the doors 70a and 70b provides both high pressure and low pressure turning of the fan bypass air flow to achieve a desired outboard deflection of the flow. Aft extensions 88 of the centerbody 82 may be employed to further define the inboard extreme of the flowpath with the doors in the open condition. As with the first embodiment, flow volume of fan bypass air is controllable by the FAMV by positioning the doors at any desired rotation along arcs 90 between the fully closed position of FIG. 8 and the fully open position of FIG. 9 using the actuator 74.

Positioning of the hinges 72a and 72b in the airfoil shape of the doors may be accomplished to provide aerodynamic balancing of the doors through the range of operation. Additionally relative placement of the hinged joints 80a and 80b and hinges 72a and 72b may be established to minimize actuator forces required for operation of the doors through the range of motion from the closed to open position.

Figure 10:
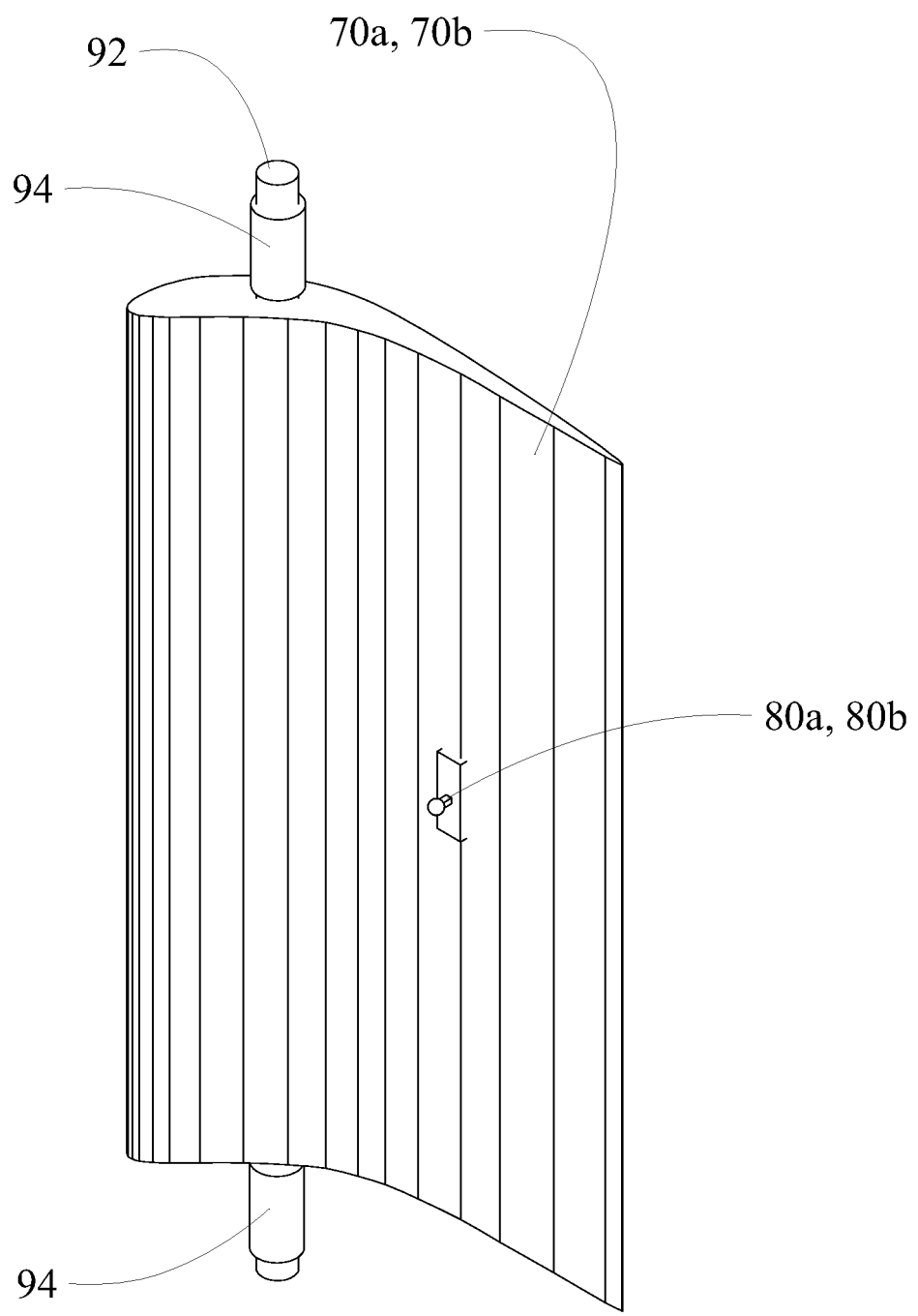
FIG. 10 is an isometric hidden line view of an exemplary airfoil structure for use as the doors with the embodiment of FIGS. 8 and 9.

An example of a door 70a, 70b as employed in the second embodiment is shown in FIG. 10. A hinge rod 92 extends through the airfoil shape of the door located approximately at the ¼ chord point or as otherwise determined for aerodynamic balancing considerations as previously described. While the embodiment shown in the drawings provides the hinge rod extending completely through the structure, as previously described with respect to the example embodiment of FIG. 7, in alternative embodiments a monocoque structure for load bearing with rod ends may be employed. Rotational bearings 94 are employed to attach the doors to associated structure extending from the precooler exit such as upper and lower walls of the exit plenum. The hinged joints 80a and 80b provide attachment points for the tie rods 78a and 78b.

The tie rods in the embodiments described are shown as rigid rods. In alternative embodiments, push-pull cable attachments with appropriate routing and attachment may be employed, with or without spring return elements. Additionally while the tie rods are shown in the drawings as attached to centrally-located hinge points, bifurcated rods attached to hinge points near the periphery of the doors may be employed with appropriate lateral mounting extensions from the actuator push rod, or by employing a V-shaped pushrod. In yet other embodiments, a rotary actuator may act on the hinge rod, directly or through a gear train.

Figure 11:
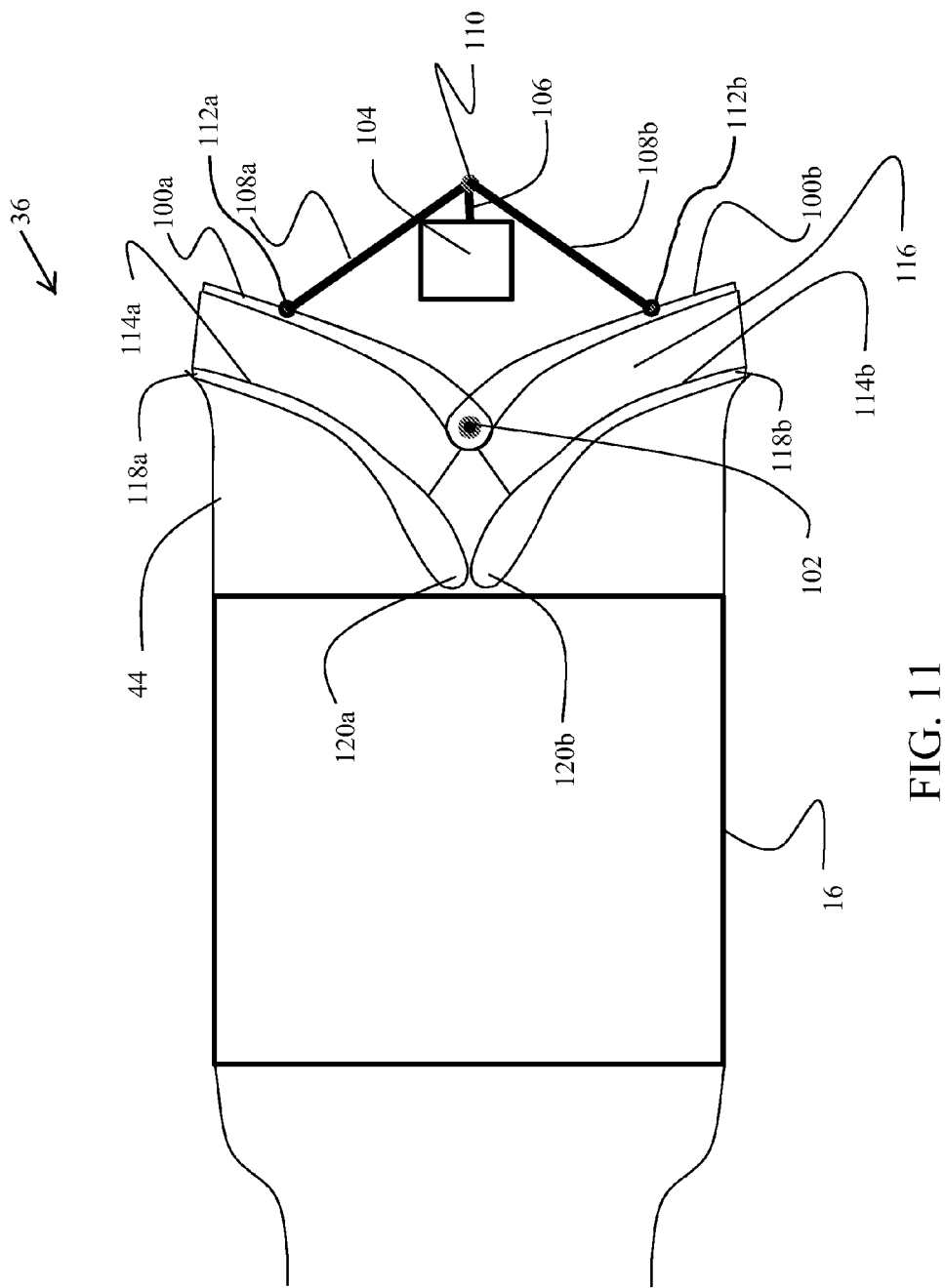
FIG. 11 is a top section view of a third embodiment of the heat exchange system with the FAMV in a closed position.
Figure 12:
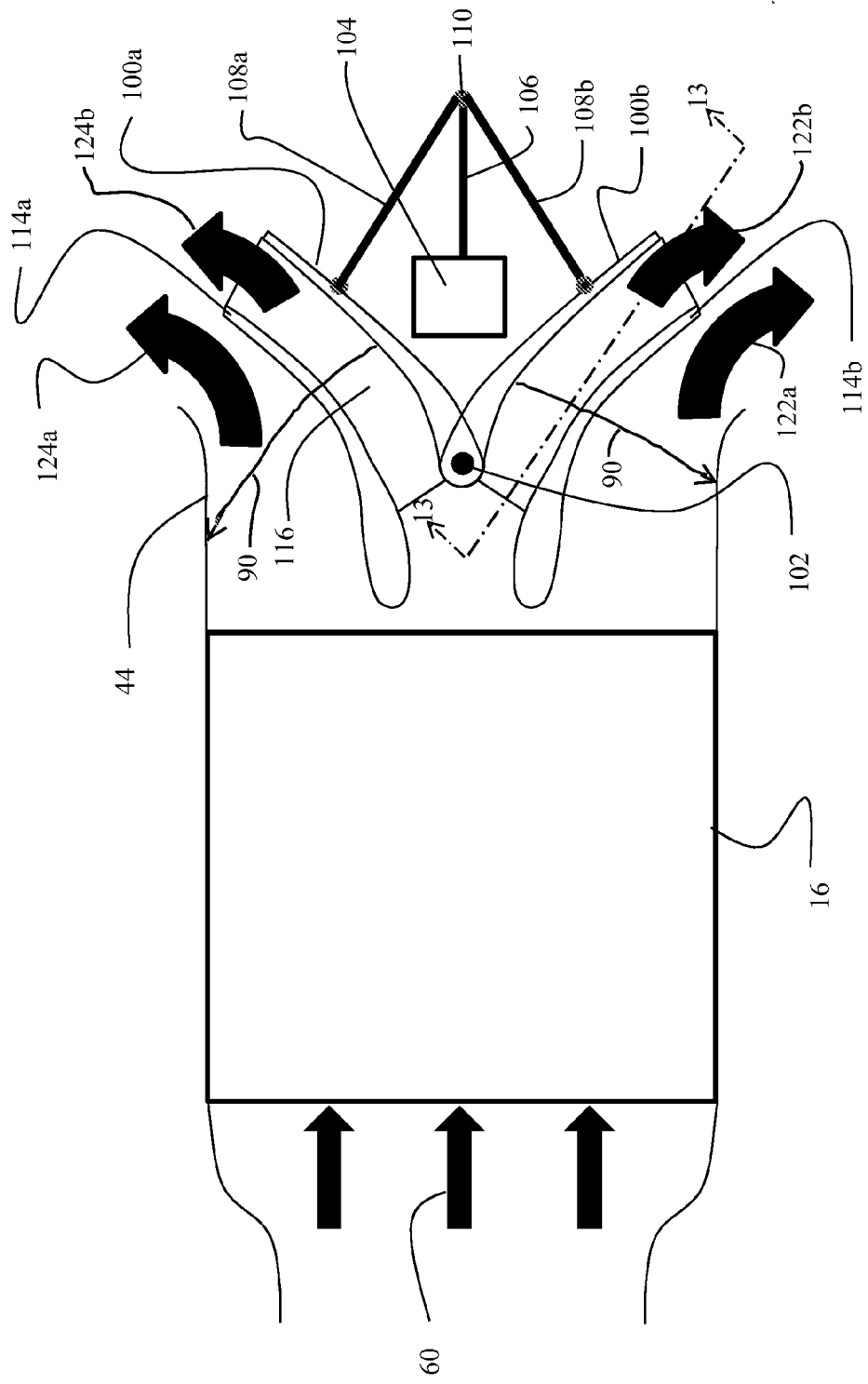
FIG. 12 is a top section view of the embodiment of FIG. 11 with the FAMV is a fully open position.

The first and second embodiments described above may be combined into a single FAMV as shown in FIGS. 11 and 12 to provide additional directional control and functionality. As shown in FIG. 11 in the closed position, FAMV 36 incorporates a first pair of flow control and directing doors 100a and 100b which are rotatable about a central hinge 102. An actuator 104 having a push rod 106 is connected through tie rods 108a and 108b to the doors 100a and 100b respectively from a single pivot 110 for simultaneous motion. Structure of the doors 100a and 100b may be comparable to that described with respect to FIG. 7. For the embodiment shown, the doors have an aerodynamic or airfoil shape and the tie rods 108a and 108b connect at approximately mid chord of the airfoils in hinged joints 112a and 112b. A second pair of doors 114a and 114b are rigidly connected to the first pair of doors 100a and 100b with intermediate webs 116, which will be described in greater detail subsequently. Structure of doors 114a and 114b may be similar to that described with respect to FIG. 10 without the hinge rod and bearings. In the closed position as shown in FIG. 11, the trailing edges 118a and 118b of the second pair of doors 114a and 114b respectively are received against a trailing edge of the outlet plenum 44. Additionally, the leading edges 120a and 120b contact one another for sealing closure to shut off flow of fan bypass air through the precooler 16.

In a fully open position as shown in FIG. 12, the first pair of doors 100a and 100b rotating about hinge 102 replaces the centerbody of the second embodiment, creating four flow paths for fan bypass air; two outboard flow paths indicated by arrows 122a and 122b and a two inboard flow paths indicated by arrows 124a and 124b, between the first pair of doors 100a and 100b and the second pair of doors 114a and 114b. Aerodynamic shaping of the doors 114a and 114b provides both high pressure and low pressure turning of the fan bypass air flow to achieve, in combination with the directional flow created by doors 100a and 100b, a desired outboard deflection of the flow. Again flow volume of fan bypass air is controllable by the FAMV by positioning the doors at any desired rotation along arcs 90 between the fully closed position of FIG. 11 and the fully open position of FIG. 12 using the actuator 104. As with the prior embodiments, modulation of the fan bypass air flow is accomplished by control of the actuator in the range between the closed and fully open positions.

Figures 13A, 13B:
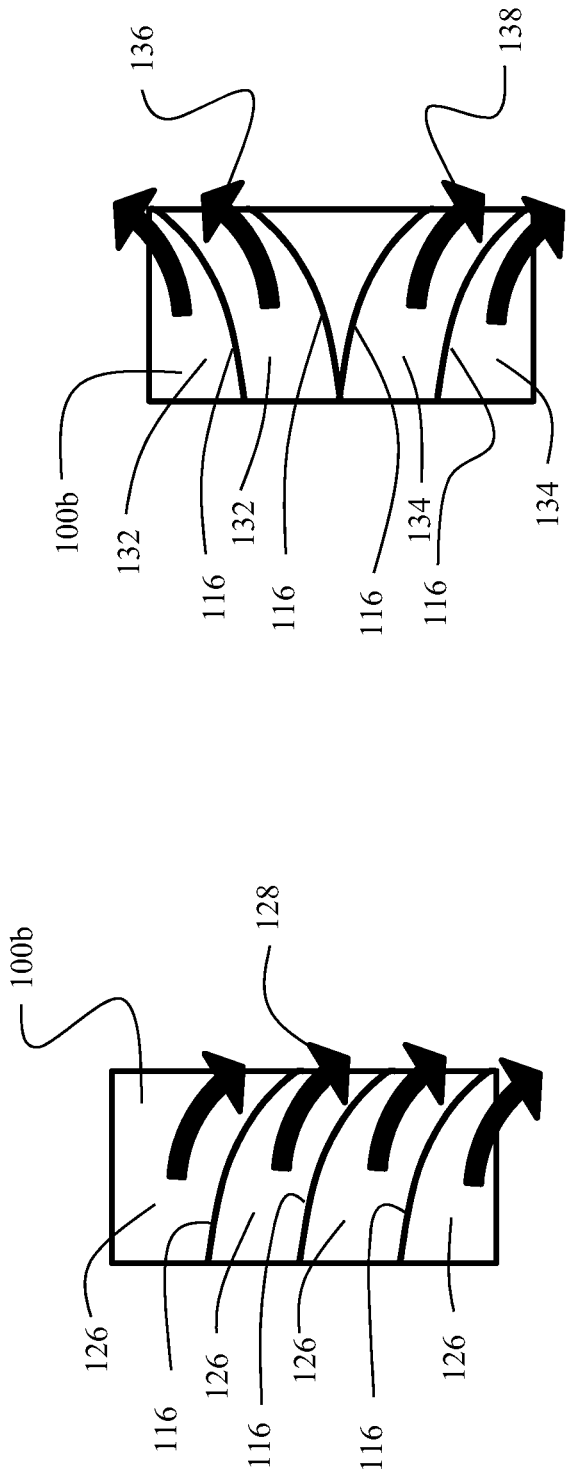
FIG. 13A is a side section view along line 13-13 showing connecting webs between the doors employed as vertical flow control vanes for a single flow direction.
FIG. 13B is a side section view long line 13-13 showing the vertical flow control vanes for dual flow directions; and, FIG. 14 is a flow chart of the operational sequence of the embodiments for modulation and deflection of fan bypass air flow exiting the precooler.

Intermediate webs 116 may be employed to add stability to the flow and may additionally provide flow turning in upwards or downwards directions for further directional control of the flow pattern within the strut fairing 14 as shown in FIGS. 13A and 13B. The webs 116 create multiple channels 126 to direct flow as shown by the arrows 128 in FIG. 13A in a downward direction (in alternative embodiments a single upward flow turning direction may also be provided). FIG. 13B demonstrates bidirectional flow created by channels 132 and 134, both upward and downward, as depicted by arrows 136 and 138.

Figure 14:
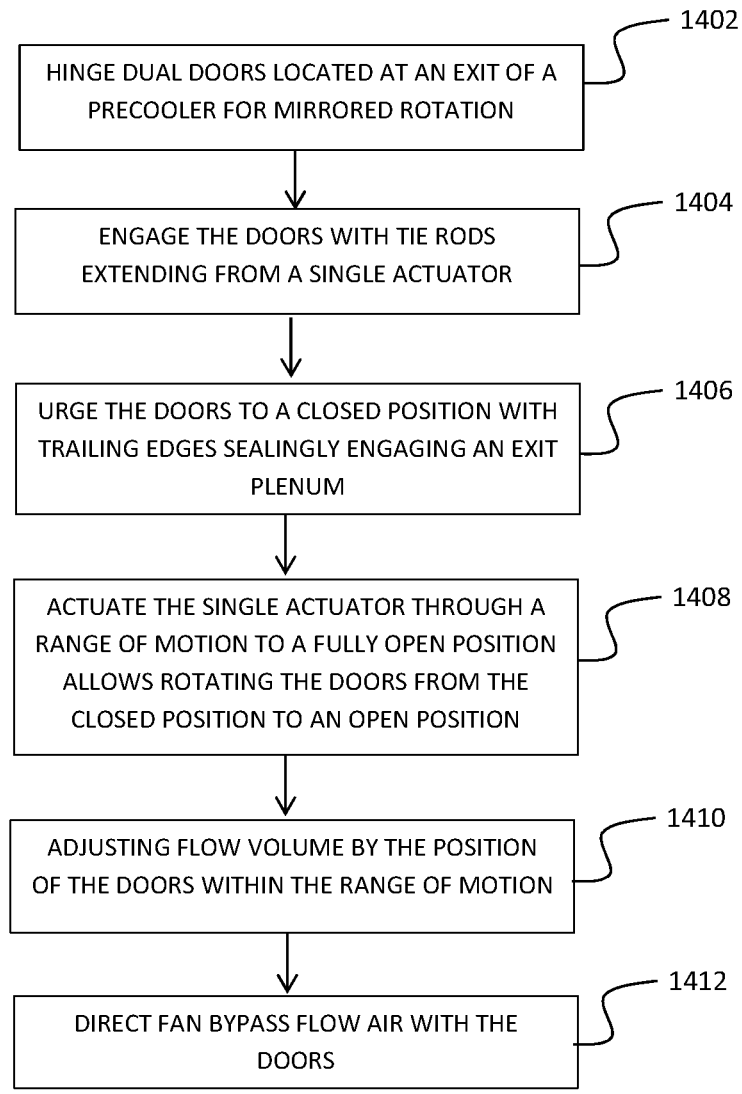

In operation, the embodiments of the present invention provide a method as shown in FIG. 14 for flow control of fan bypass air by hinging dual doors located at an exit of a precooler for mirrored rotation, step 1402. Engaging the doors with tie rods extending from a single actuator, step 1404 allows urging the doors to a closed position with trailing edges sealingly engaging an exit plenum, step 1406. Actuating the single actuator through a range of motion to a fully open position allows rotating the doors from the closed position to an open position, step 1408. Adjusting flow volume by the position of the doors within the range of motion, step 1410, and directing fan bypass flow air with the doors, step 1412 allows single action control of the flow to both modulate and deflect and guide the flow as necessary to avoid sensitive structure or components and achieve flow field control within the strut fairing.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A fan air modulating valve (FAMV) comprising:
   at least one pair of doors rotatably attached at an air exit of a fan bypass air cooled device; and, an actuator incorporating a push rod extendible from a first position corresponding to the closed position to a second position corresponding to the open position and tie rods connected at a single hinge point on the push rod and extending to a hinge joint on the doors for simultaneous and mirrored rotation from a closed position to an open position, wherein said doors sealingly engage an exit plenum extending from the fan bypass air cooled device in a closed position and deflect a flow of fan bypass air in an open position.

2. The FAMV as defined in claim 1 further comprising a hinge rod received within a leading edge of each of the doors to support rotation of the door.

3. The FAMV as defined in claim 1 wherein rotation of the doors from the closed position to the open position is controllable through a range of motion by the actuator for modulation of fan bypass air.

4. The FAMV as defined in claim 1 wherein the doors have an airfoil shape and the hinge joint on each door is located at about mid chord.

5. The FAMV as defined in claim 1 wherein the doors have an airfoil shape.

6. The FAMV as defined in claim 1 wherein the doors incorporate an airfoil shape and further comprising:
   an aerodynamic centerbody located between leading edges of the doors;
   a hinge rod received within each of the doors for rotation of the doors, a first inboard flow path between the first one of the doors and the exit plenum and a second inboard flow path between the aerodynamic centerbody and the first one of the doors, and a first outboard flow path between the second one of the doors and the exit plenum and a second outboard flow path between the aerodynamic centerbody and the second one of the doors established upon rotation of the doors.

7. The FAMV as defined in claim 6 wherein the hinge rod is located near ¼ chord of the airfoil.

8. The FAMV as defined in claim 6 wherein the hinge rod is located to minimize actuation forces.

9. A FAMV comprising:
   two symmetrically opposed first and second doors, each door incorporating a hinge rod received within a leading edge to support rotation of the door;
   an actuator engaging the doors for simultaneous and mirrored rotation from a closed position to an open position, wherein said doors sealingly engage an exit plenum extending from the precooler;
   a second pair of doors including a third door attached by a web to and spaced from the first door and a fourth door attached by web to and spaced from the second door, rotation of first and third doors from the closed position creates a first outboard flow path between the third door and the exit plenum and a second outboard flow path between the third door and the first door, and rotation of the second door and fourth door from the closed position creates a first inboard flow path between the fourth door and the exit plenum and a second inboard flow path between the fourth door and the second door, and wherein the trailing edges sealingly engaging the exit plenum comprise the trailing edges of the third and fourth doors, and a leading edge of the third door seals with a leading edge of the fourth door in the closed position.

10. The FAMV as defined in claim 9 wherein the web incorporates a plurality of flow channels.

11. The FAMV as defined in claim 10 wherein the fan bypass air cooled device is located in a strut fairing and the inboard and outboard flow paths direct flow laterally within the strut fairing and the plurality of flow channels direct flow vertically.

12. The FAMV as defined in claim 11 wherein the flow channels direct flow both upward and downward.

13. A precooler system comprising:
   an inlet plenum receiving incoming fan bypass air;
   a precooler operatively attached to the inlet plenum to receive the fan bypass air;
   an exit plenum extending from the precooler to receive exiting fan bypass air;
   a fan air modulating valve (FAMV) having
     a pair of doors rotatably attached at the exit plenum; and,
     an actuator incorporating a push rod extendible from a first position corresponding to the closed position to a second position corresponding to the open position and tie rods connected at a single hinge point on the push rod and extending to a hinge joint on the doors for simultaneous and mirrored rotation from a closed position to an open position, wherein said doors sealingly engage an exit plenum extending from the fan bypass air cooled device in a closed position and deflect a flow of fan bypass air in an open position.

14. The precooler system as defined in claim 13 further comprising a hinge rod in each of the doors to support rotation of the door.

15. The precooler system as defined in claim 13 wherein rotation of the doors from the closed position to the open position is controllable through a range of motion by the actuator for modulation of fan bypass air.

16. The precooler system as defined in claim 13 wherein the doors have an airfoil shape.

17. The precooler system as defined in claim 13 wherein the doors have an airfoil shape and the hinge joint on each door is located near mid chord.

18. A precooler system comprising:
   an inlet plenum receiving incoming fan bypass air;
   a precooler operatively attached to the inlet plenum to receive the fan bypass air;
   an exit plenum extending from the precooler to receive exiting fan bypass air;
   a fan air modulating valve (FAMV) having
     a pair of doors incorporating an airfoil shape and rotatably attached at the exit plenum; and,
     an actuator engaging the doors for simultaneous rotation from a closed position to a open position, wherein said doors sealingly engage the exit plenum;
     an aerodynamic centerbody located between leading edges of the doors;
     a hinge rod received within each of the doors for rotation of the doors, a first inboard flow path between the first one of the doors and the exit plenum and a second inboard flow path between the aerodynamic centerbody and the first one of the doors, and a first outboard flow path between the second one of the doors and the exit plenum and a second outboard flow path between the aerodynamic centerbody and the second one of the doors established upon rotation of the doors;
     wherein the actuator incorporates a push rod extendible from a first position corresponding to the closed position to a second position corresponding to the open position and the FAMV further comprises tie rods connected at a single hinge point on the push rod and extending to a hinge joint on the doors.

19. The precooler system as defined in claim 18 wherein the hinge rod is located to minimize actuation forces.

20. A method for modulating and directing of fan bypass air in a precooler comprising:
- urging dual doors, located at an exit of a precooler and hinged for simultaneous and mirrored rotation, to a closed position with trailing edges of the doors sealingly engaging an exit plenum;
- actuating a single actuator incorporating a push rod extendible from a first position corresponding to the closed position to a second position corresponding to the open position and tie rods connected at a single hinge point on the push rod and extending to a hinge joint on the doors through a range of motion to a fully open position to rotate the doors from the closed position to an open position;
- adjusting flow volume by the position of the doors within the range of motion; and
- deflecting fan bypass flow air with the doors.

* * * * *